United States Patent [19]

Reese

[11] 4,341,039

[45] Jul. 27, 1982

[54] SELF-ADJUSTING PLANT INSULATOR WITH LIQUID CONTAINER

[76] Inventor: Stanton L. Reese, 726 Laurel La., Lakeland, Fla. 33803

[21] Appl. No.: 90,079

[22] Filed: Oct. 31, 1979

Related U.S. Application Data

[63] Continuation-in-part of Ser. No. 971,184, Dec. 20, 1978, abandoned.

[51] Int. Cl.³ ............................................. A01G 13/00
[52] U.S. Cl. ............................................. 47/2; 47/23; 47/24; 47/26; 47/30
[58] Field of Search ................................ 47/2, 20–25, 47/29, 30, 26, 28, 32

[56] References Cited

U.S. PATENT DOCUMENTS

| | | | |
|---|---|---|---|
| 635,397 | 10/1899 | Schlaefer | 47/24 |
| 3,218,759 | 11/1965 | Barrons | 47/30 |
| 3,466,799 | 9/1969 | Stilson | 47/21 |
| 4,137,667 | 2/1979 | Wallace et al. | 47/26 |

FOREIGN PATENT DOCUMENTS

| | | | |
|---|---|---|---|
| 876491 | 5/1953 | Fed. Rep. of Germany | 47/23 |
| 1953652 | 5/1971 | Fed. Rep. of Germany | 47/26 |
| 444859 | 10/1912 | France | 47/24 |
| 1144366 | 3/1969 | United Kingdom | 47/2 |

OTHER PUBLICATIONS

"Soil Banks or Fiberglas Wraps for Young Citrus Trees", The Citrus Industry, Jan. 1969.
283 May '65, "Banking Young Citrus", Agricultural Extension Service of U. of Florida, Gainesville.
"The Use of Insulating Wraps for Protection of Citrus Trees From Freeze Damage," Proceedings First International Citrus Symposium, vol. 2, 1969.

*Primary Examiner*—Steven A. Bratlie
*Attorney, Agent, or Firm*—Fleit & Jacobson

[57] ABSTRACT

An insulating device or insulator for trunks of trees or plants is described that provides protection and thermal insulation against damaging cold during their tender years. This device is adjusted for fit about the trunk by the trunk itself as it increases in girth, thus providing effectiveness for several years without attention. The insulating device is weather resistant, protecting the young trunk from both wind damage and the effects of water from rain or irrigation. The device also protects the trunk against bark chewing rodents and prevents sprouting along the lower trunk. A preferred embodiment of the device includes liquid receiving pockets that act as "heat sinks" to protect the trunk from below freezing temperatures.

28 Claims, 8 Drawing Figures

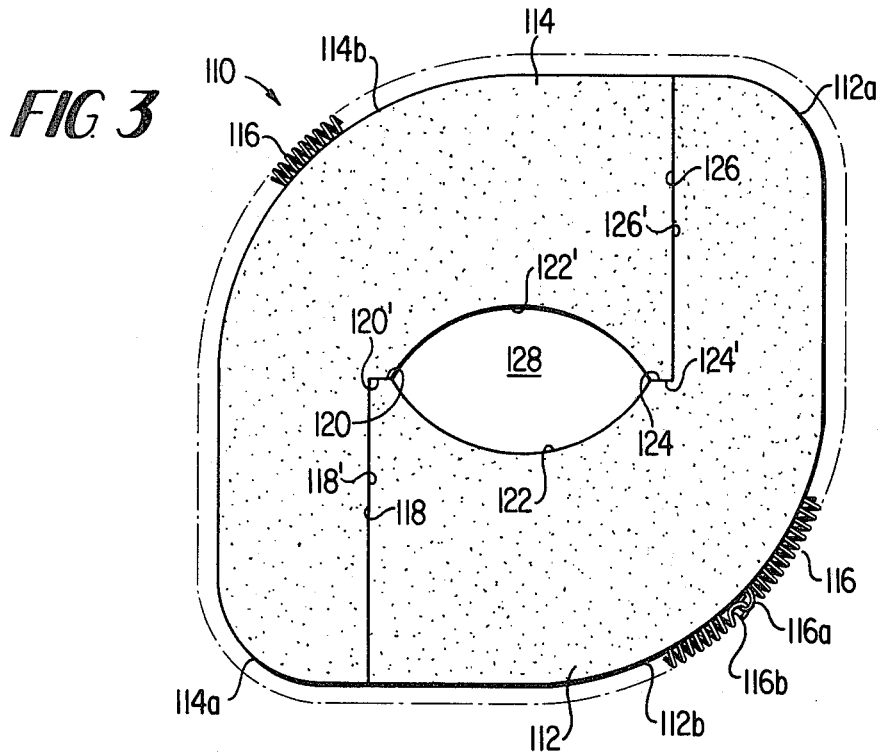
FIG. 3
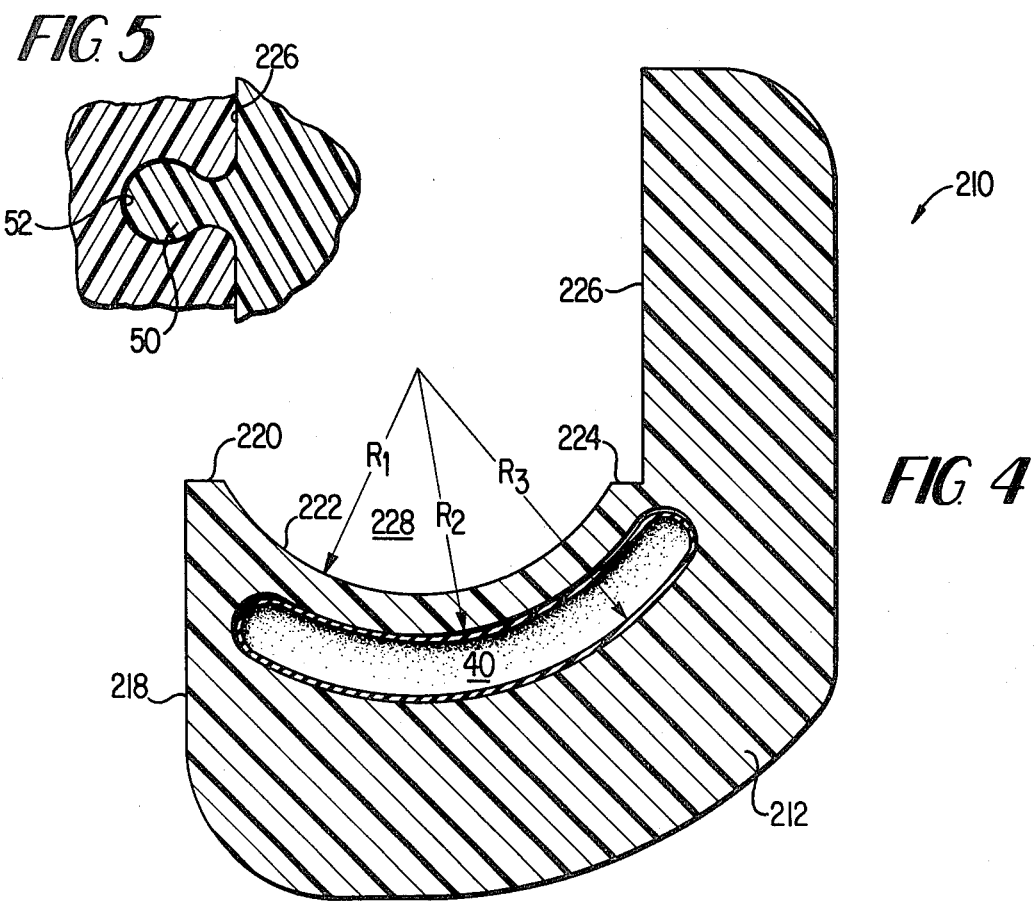
FIG. 5
FIG. 4

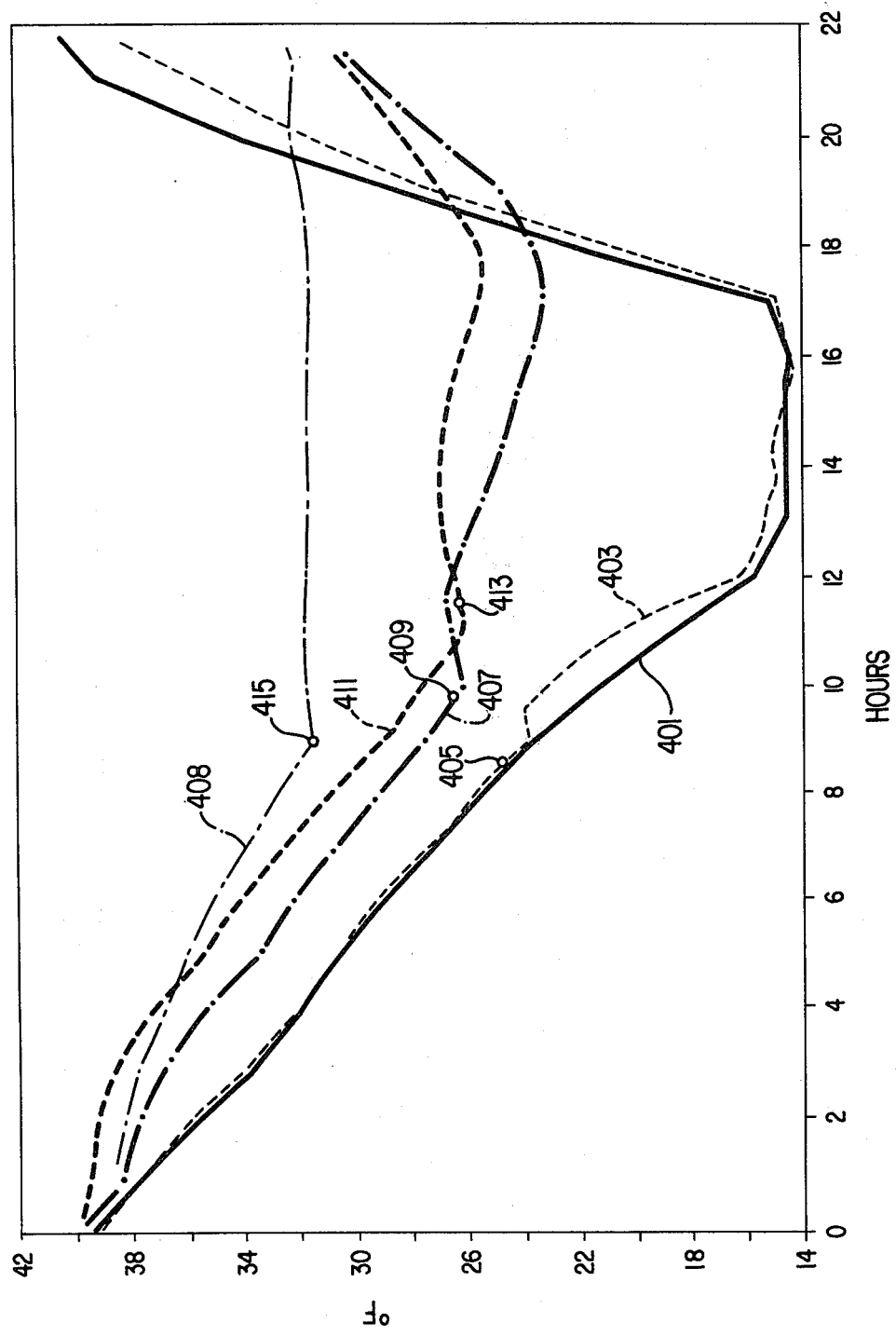

SELF-ADJUSTING PLANT INSULATOR WITH LIQUID CONTAINER

CROSS-REFERENCE TO RELATED APPLICATION

This application is a continuation-in-part application of U.S. patent application Ser. No. 971,184, filed Dec. 20, 1978, now abandoned.

BACKGROUND OF THE INVENTION

1. Field of the Invention

This invention relates to devices for protecting the trunks of growing trees, and, more particularly, to such devices that automatically expand as the trunks increase in diameter.

2. Description of the Prior Art

Many woody plants, including several species of fruit trees, especially citrus trees, are much less cold hardy when young than they are after they attain some size. In order to preserve these young plants during short periods of killing cold, which most often occur late at night, it is common practice to insulate the trunk or main stem of the plant. Thus, if the exposed top is killed by exposure to cold, the plant will sprout from the trunk new growth during the next growing season. Protection of the trunk is particularly important where the fruiting wood on fruit trees, or the blooming wood in plants that are raised for their flowers, is of a different variety than is the root stock because a plant that sprouts below the graft or the bud union, if a budded tree, is of no value.

Probably the most commonly used method of protecting the trunks of plants from cold is to pile dirt up around the trunks, often called "banking", to act as an insulator. The disadvantages of this practice are many and include: (1) banking and unbanking with its associated cost must be performed each fall and spring, respectively; (2) wind and rain may remove the bank; (3) rodents may burrow into the bank and nest, damaging the plant, and often using the bark for food; (4) if the plants are not unbanked before the weather becomes warm, the bark may be damaged by "steaming" caused by the hot moist soil packed up against it; (5) roots are often damaged from digging too deeply when removing the bank; (6) in the case of citrus trees, soil placed above the bud union promotes the growth of a fungus disease, known as "foot rot", which destroys the bark and frequently girdles the tree, killing it, and soil is often not completely removed below the bud union when the bank is removed; and (7) tools often strike the trunk, damaging the tender bark.

Work has been carried on over the years, particularly at Texas A & I University, to develop an insulator for young trees with fewer faults. These have included rock wool wrapped in roofing felt; fiberglass held in place with chicken wire; and finally, a polyurethane foam blanket wrapped around the trunk of the tree and secured with metal straps. The rock wool was found to harbor rodents; the fiberglass sagged under heavy rain; and the polyurethane foam tended to deteriorate from exposure to the sun. This work is reported by R. A. Hensz of the Texas A & I University Citrus Center, Westlaco, Tex., in a paper entitled "The Use of Insulating Wraps for Protection of Citrus Trees from Freeze Damage". All three of these materials readily saturate with water from rain or from irrigation. This is a particularly serious drawback in that the thermal insulating properties of these materials, which is in the range of $K = 0.2$ to $0.3$ BTU per hour, per °F., per square foot of area, per inch of thickness, when the material is dry becomes more nearly that of water which transmits heat at the rate of $K = 4.1$ BTU per hour, per °F. per square foot per inch of thickness, or about 20 times the rate of heat transfer of the insulating material. Further, it has been reported by Robert Leyden and R. H. Hensz of Texas A & I University in a publication entitled "Effects of Conventional Cold Protection Systems in a Radiational Freeze", that irrigation prior to a freeze results in a warmer orchard during a freeze than one that is dry, because the water in the ground increases its heat capacity. Following this practice results in wet insulation at the time of the freeze. In addition, these wet insulating materials are slow to dry out and they are in intimate contact with the tree, which promotes the growth of undesirable fungus.

Of the insulating wraps tried, only the polyurethane foam has achieved any degree of commercial importance. A sheet of this material is usually wrapped around the tree several times and held in place by one person while a second person straps it with two inelastic metal bands or with nylon string. The urethane foam is easily compressed, and, in applying the metal straps this frequently occurs, reducing the effective thickness of insulation. Also, as the girth of the tree increases, it compresses the insulation if the straps are not manually adjusted, and this reduces the thickness and effectiveness of the wrap as a thermal insulator.

SUMMARY OF THE INVENTION

In order to overcome the many faults found with the devices and methods previously used to protect young woody plants from cold, the present invention provides an insulating device composed of a semi-rigid insulating material, such as expanded polystyrene, styrafoam, treated wood, or polyurethane, which insulating device consists of two halves held closely around the trunk of the plant or young tree, regardless of its diameter, up to the maximum trunk girth for which protection is desired. This is accomplished with any suitable mechanism or elastic fastener, such as a generally U-shaped spring clip, or a coil spring fastened together at its ends.

With one embodiment of the invention, the internal faces of the two halves are shaped in the form of a Z having 90° angles. A cut-out is provided in the center of the halves so that, when the two halves are placed tightly together, the cut-out or hole will accommodate the plants at their initial diameter. In order not to have a large hole or opening in the center from which heat can escape while the plant is small, the dimension of the opening across the two halves when they are fitted closely together is oval and has a shorter axis that measures about the same across as the diameter of the plant to which it is to be applied. As the plant increases in girth, it exerts pressure against the walls of the opening, and the parallel faces slide along each other, against the pressure of the elastic holding device, enlarging the opening without significant change in the average thickness of insulation. In order to improve the resistance of the insulator to water absorption and to protect it from deterioration by the sun, the insulator may be coated with a preservative, such as a vinyl acrylic mastic, acrylic latex paint, or other similar coating. A fungicide, such as a neutral copper compound, may be incorporated in the perservative coating to provide an undesirable environment for mildew and fungus on the insulator and the adjacent plant.

In a preferred modification of this embodiment, internal portions of the halves have recesses formed therein. Sealed containers of liquid are secured in the recesses to form heat sinks. Preferably, the liquid has a freezing point above the temperature at which damage occurs to a protected plant, so that when temperatures drop below the freezing point of the liquid for short periods of time, the latent heat of fusion of the liquid is available to protect the plant. A particularly preferred liquid is water because of its temperature of freezing at about 32° F., which is slightly above that temperature which will damage young tree and plant trunks, and because of its high latent heat of fusion, which affords a long period of relatively high temperature around the trunk during low ambient termperature conditions. Preferably, a flat splint made of a suitable material, such as a suitable polyvinyl chloride, an ABS copolymer, or high impact styrene, is inserted into the ends of the half to provide a space between the solution container and the plant for rapid water drainage and to retain the container within the recess. It has also been found desirable to seed the liquid with a crystallizing agent in order to prevent supercooling and promote crystallization when the liquid temperature reaches freezing. For water, phenazine or silver iodide crystals have been found to be suitable additives for this purpose. In a further modification of the present invention, ventilation slots are formed in the halves, for instance in the mating faces, to allow air drying of the protected trunk. These slots avoid an environment that might promote the growth of destructive fungus, such as phytophthora which is one of the principal causes of citrus tree mortality.

Advantages of the protecting and insulating device of the present invention over other devices and methods previously used include the following:

1. The device can be quickly installed by one person who simply fits the two halves together around the plant and slips on the spring clip.
2. No further attention to the device is needed until the device is no longer needed to protect the trunk, unless the top of the plant is killed by cold. In that event, the device must be removed before growth starts in the spring so that the plant can sprout from the wood that was protected by the insulator. Once the upper sprouts have hardened, lower sprouts may be removed and the insulating unit reapplied for protection in subsequent winters.
3. The insulator is not eroded away by wind or rain, as with earth mounds and with rock wool and fiberglass.
4. The insulating device, in its preferred form, provides a heat sink in the form of the heat content and the latent heat of fusion of a liquid adjacent the tree trunk, which gives up heat which may include its latent heat during freezing temperature conditions while maintaining a relatively high temperature around the protected trunk.
5. The insulator, particularly with its coating in place which protects it against ultraviolet deterioration, remains highly resistant to water penetration for several years. Thus, its thermal insulating efficiency is essentially unimpaired by rain or by wetting during irrigation, the latter having been found to be beneficial before a freeze because water increases the heat capacity of the soil.
6. The surface of the device adjacent to the plant, unlike surfaces of previous insulating devices, retains very little moisture, and the liquid heat sink moderates the temperature, minimizing the possibility of steaming. Steaming causes the bark to slough off, which kills the tree.
7. Unlike its predecessors, the semi-rigid nature of the insulating device makes it amenable to coating with a weather resistant coating for improved life, and to incorporation of a fungicide to retard the formation of undesirable growth.
8. If the insulating device is not removed by the time the diameter of the trunk of the plant reaches a desired size, the device cannot accommodate the force exerted by the trunk. The insulator then falls or breaks away without damage to the plant.
9. The semi-rigid nature of the insulating device of the present invention, unlike other devices, aids in straightening the trunks of tender plants.
10. The device can be easily and quickly removed to allow visual inspection of the trunk and easily reinstalled to protect the tree.

A year-round tree protector of the type provided by the present invention provides additional benefits to the young plant in that it protects it from herbicides used to kill grass and weeds, sun scald, sand abrasion, and injury from tools used in cultivation. The device also prevents the accumulation of soil around the tree trunk during cultivation. Soil around the trunk creates an ideal environment for foot rot fungus. In fact, soil may be placed around the insulator for added protection, with safety.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 3 is a top view of another embodiment of the present invention;

FIG. 4 is a view similar to FIG. 2 of still another embodiment of the present invention;

FIG. 5 is a side view of a modification of the embodiment of FIG. 4;

FIG. 8 is a graph showing the results of certain comparative tests.

DESCRIPTION OF THE PREFERRED EMBODIMENTS

Figure 1:
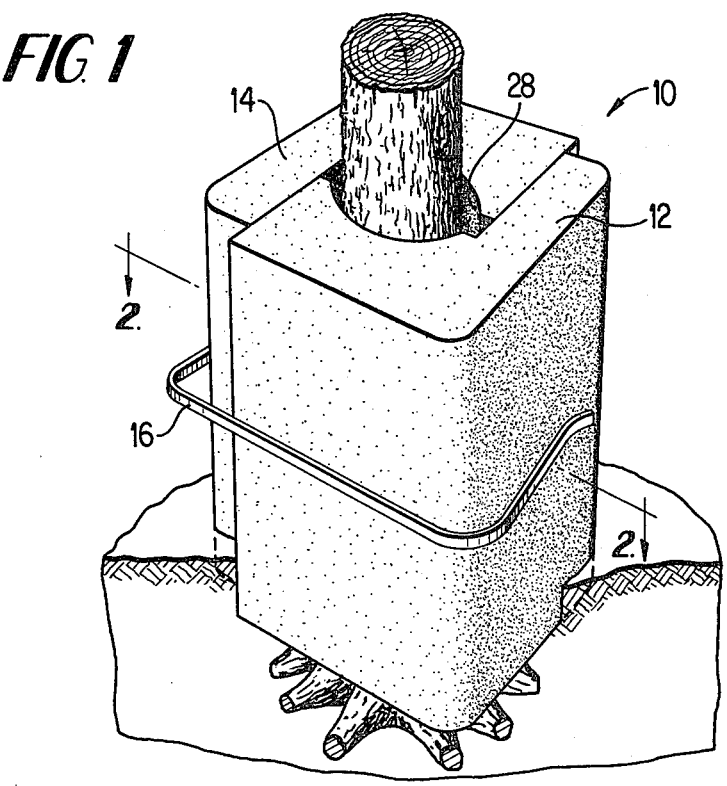
FIG. 1 is a perspective view of one embodiment of the present invention positioned on a plant or young tree to be protected.

Because tree and plant protection methods and devices are well-known, the present description will be directed in particular to elements forming part of, or cooperating more directly with, the present invention. Elements not specifically shown or described herein are understood to be selectable from those known in the art.

Referring now to the drawings, and to FIGS. 1 and 2 in particular, one embodiment of the present invention is illustrated and will be described in connection with an insulator, generally designated 10.

The insulator 10 is comprised of halves 12 and 14 that are interconnected by a suitable spring mechanism, such as clip 16. Part 12 has vertically extending faces 18, 20, 22, 24 and 26. Part 14, which is shaped substantially identical to part 12, includes faces 18', 20', 22', 24' and 26'. As illustrated in FIG. 2, the faces 20 and 20' are substantially coplanar with the end faces 24 and 24', respectively. Also, the end faces 20 and 24 are interconnected by a recessed, arcuate-shaped end face 22. A similar arcuate-shaped face 22' connects the faces 20' and 24'. While not shown, external faces of halves 12 and 14 could be moulded or routed to form one or more relatively small, horizontally-extending slots for receiving and holding one or more spring clips 16 in proper positions.

Preferably, the halves of the insulator are formed in a mold; however, any other suitable method, for instance using a hot wire to "cut" a block of expanded polystyrene, can be used to form the halves.

In one embodiment of the present invention, each of the pieces 12 and 14 is approximately 6 inches wide, 6 inches deep and between 14 and 18 inches long. The faces 22 and 22' have a radius of curvature of approximately $1\frac{1}{2}$ inches, with the centers of the arcs being positioned approximately $1\frac{1}{2}$ inches from the planes of the faces 18, 18' and 26, 26'. It will be appreciated that the faces 18, 18' and 26, 26' are substantially coplanar with each other so that contact is maintained between the faces during enlargement of a cavity 28 formed in the insulator 10. Also, the external corners of the parts 12 and 14 are rounded with a radius of curvature of approximately 1 inch. It will be appreciated that the preceding dimensions are merely illustrative of one embodiment of the present invention and can be increased or decreased, depending upon the intended use of the insulator.

Figure 2:
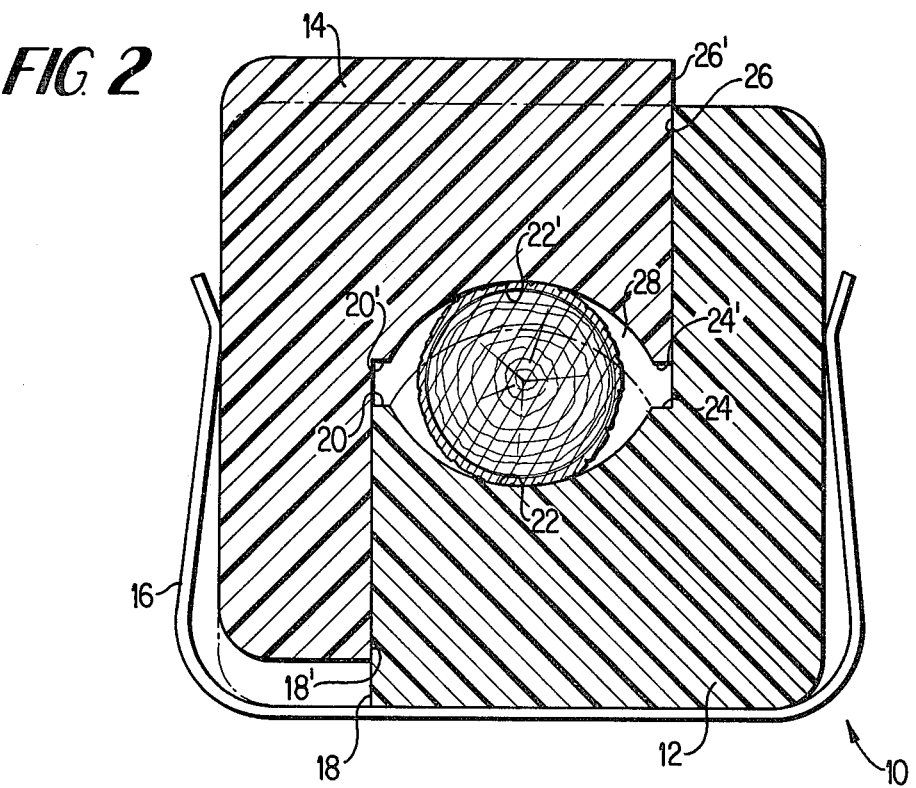
FIG. 2 is a cross-sectional view along line 2—2 of FIG. 1.

As illustrated in FIG. 2, the spring 16 has two inwardly bent portions that exert forces on the members 12 and 14 that tend to keep the faces 18, 18' and 26, 26' in contact with each other. The force exerted on the members 12 and 14 is preferably not so great that it causes deformation of the material forming the members. In one embodiment, a spring force of approximately two to three pounds has been found acceptable. Also, one embodiment utilizes a piece of round spring wire to form the spring 16.

Referring now to FIG. 3, another embodiment of the present invention is illustrated. This embodiment is similar to the embodiment previously discussed in connection with FIGS. 1 and 2. Accordingly, the same reference numerals, preceded by the numeral "1", have been used to identify components similar to those previously described.

The insulator illustrated in FIG. 3, which is generally designated 110, has two halves 112 and 114 which are held in contact with each other by a coiled spring 116 having interconnected ends (116a and 116b). Preferably, the halves are identical and define a cavity 128 therebetween. It will be appreciated that other connection methods can be used to join the halves 112 and 114 to each other. Any method, for instance, rods extending parallel to the faces 118, 118' and 126, 126' and passing through both halves, that allows relative movement between the faces 118 and 118' and faces 126, 126', while maintaining contact between the faces, can be used with the present invention. Part 112 has one exterior corner 112a formed with a radius of curvature, for instance, approximately 1 inch, and another corner, 112b, formed with a larger radius of curvature, for instance, approximately 3 inches. Part 114 includes similarly shaped exterior corners 114a and 114b. Use of rounded corners 112b and 114b results in a significant savings of material used to form the insulator 110.

Referring now to FIG. 4, another embodiment of the present invention is illustrated. This embodiment is also similar to the previously discussed embodiments and the same reference numerals, preceded by the numeral "2", have been used to identify similar components already described.

As illustrated in FIG. 4, an insulator, which is generally designated 210, is formed of two substantially identical parts, one of which, designated 212, is illustrated. The part 212 has vertically extending end faces 218, 220, 222, 224 and 226. These end faces cooperate with similar end faces on the other part to define a variable size opening 228 in the center of the insulator 210.

The primary difference between the embodiment illustrated in FIG. 4 and those illustrated in FIGS. 1-3, is the provision of a cavity or well 40 in part 212. A similar cavity can also be formed in the non-illustrated part. It will also be appreciated that a similar cavity can be formed in the embodiments illustrated in FIGS. 1 to 3. The cavity 40 has a bottom closed by the bottom of part 212 and opened through the top surface of part 212. Preferably, the cavity has arcuate-shaped inner and outer surfaces having radii of curvature $R_2$ and $R_3$, respectively. The radius $R_2$ is greater than the radius $R_1$ of end face 222, so that a relatively thin layer of insulating material is provided between cavity 40 and opening 228. In the illustrated embodiment, the radii $R_1$, $R_2$ and $R_3$ all originate at the same point. The function of cavity 40 will be discussed in more detail later.

For the purposes of illustration, some representative dimensions will be given for the piece 212, as illustrated in FIG. 4. The upper right-hand portion of the illustrated piece or part 212 has a radius of curvature of $\frac{1}{2}$ inch. The portion of the part containing face 226 has a width of 1 inch, and the face 226 has a length of $2\frac{1}{2}$ inches. The distance between faces or surfaces 218 and 226 is also $2\frac{1}{2}$ inches. The radius of curvature $R_1$ is $1\frac{1}{4}$ inches, and the radius of curvature of the bottom surface is $2\frac{5}{8}$ inches. These radii have the same center and surfaces 220 and 224 are vertically spaced $\frac{5}{8}$ inches from this center. The distance between the sides of the part is $3\frac{1}{2}$ inches while the distance between the top and bottom is $4\frac{3}{4}$ inches. The overall length of the illustrated part is 14 inches, and the part is made from expanded polystyrene (1.5 lbs. p.c.f.).

Referring now to FIG. 5, an embodiment is illustrated in which the mating faces of the halves are provided with complementary tongue-and-groove connections 50 and 52, respectively. The connections are slidingly engaged with each other. Depending on the frictional force resisting relative movement between the connections, it is possible to eliminate use of the spring holding the halves together. Further, it will be appreciated that the mating faces can be formed with other mating surfaces than those illustrated. Any suitable configuration that allows relative horizontal movement between mating surfaces is acceptable.

While representative dimensions of two embodiments of the present invention have been previously described, it will be appreciated that the most practical thickness of the insulating wall in the illustrated embodiments of the present invention is that thickness which will protect the plant during the most likely periods of damaging cold, which most often occur several hours after dark and continue until sunrise. Suitable thicknesses in one embodiment vary between 1 and 2 inches. A temperature that will cause damage is usually 32° F. or below and the plant can usually withstand temperatures near the damage threshold for a longer period than colder temperatures. For example, most orange trees can withstand temperatures above 28° F. indefinitely without damage. If exposed to a temperature of 26° F. for more than 2 to 4 hours, damage is likely to occur. Accordingly, an average insulation thickness of 1.5 inches for a material with an effective K factor of 0.25 BTU per hour, per °F., per square foot of area, per inch of thickness, would prevent tree damage for about 13 hours in a typical situation.

In order to provide longer protection without increased thickness of insulation, or with even less insulation, it is contemplated for the present invention to include a built-in source of additional heat. Physically, as shown in FIG. 4, a semicircular cavity or well 40 is left near the inside wall when the insulator is formed. A container of liquid with a relatively high heat of fusion, and that freezes several degrees above the temperature at which the plant will suffer damage, such as water, is inserted into the cavity which extends nearly the full length of the insulator. After the container has been inserted into the cavity, the top of the cavity may be sealed with an insert to protect the container and improve the external appearance of the insulator. Room for expansion is provided in the container. A bag made of polyethylene film of suitable wall thickness, in which the liquid or solution is sealed, is a good example of an inexpensive container for the solution. The bottom end of the insulator is blocked to protect the container. As the temperature of the interior of the insulator reaches the freezing temperature of the solution, as occurs after several hours of exposure to below freezing temperatures, the container remains near that temperature until the solution gives up its heat of fusion, which, for water, is very substantial, i.e., 143 BTU per pound, compared to only one BTU per pound to cool water 1° F. Water is inexpensive and quite suitable for many applications. Since water, in some instances, supercools before freezing, suitable seeding particles, such as phenazine or silver iodide crystals, can be added to initiate crystallization of the water at or near its 32° F. temperature of freezing. Seeded water is particularly suited for citrus trees that are hardy to 28° F., compared to a freezing temperature of 32° F. for water. The cavities in the two halves of the insulator of FIG. 4 can be designed to hold any desired quantity of water, but about 1 pound of water is deemed more than sufficient for citrus protection. The heat of fusion released by this quantity of water, with an insulator having an average wall thickness of only 1.25 inches and a K factor of 0.25 BTU per hour, per °F., per square foot of area, per inch of thickness, will maintain the temperature at the tree above 28° F. for about sixty-four hours of continuous exposure to an ambient air temperature averaging 22° F., which exceeds the most severe conditions that are likely to occur in the citrus growing regions of the United States.

Figures 6, 7:
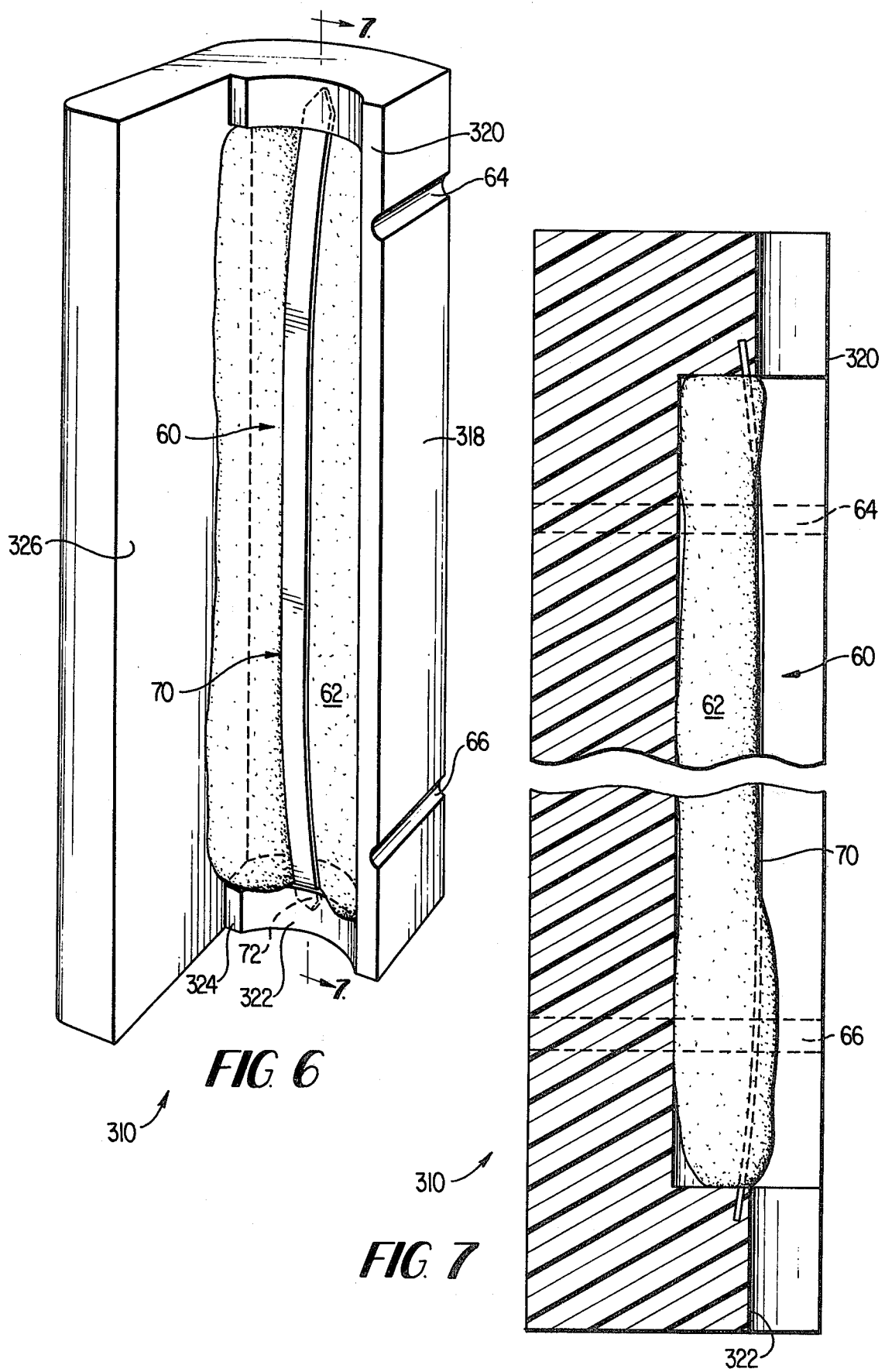
FIG. 6 is a front perspective of a modified embodiment of the present invention showing the presently preferred form.
FIG. 7 is a vertical section along line 7—7 of FIG. 6.

Another insulator adapted to contain a liquid heat source is illustrated in FIGS. 6 and 7. Since this embodiment is similar to those previously described, the same reference numerals, preceded by the numeral "3" have been used to identify components similar to those previously described. The insulator, generally designated 310, has substantially parallel faces 318 and 326 interconnected by, in sequence, a first planar face 320, a semi-circular or elliptical recess 322, and a second face 324 coplanar with face 320. The recess 322 has an opening or cavity 60 formed therein for receiving a liquid container 62. In one embodiment, the insulator is 14 inches high (or long) and the radius of curvature of recess 322 is 1¼ inches. The radius of curvature of the surface of opening or cavity 60 is 1⅞ inches. The cavity 60 starts 1¼ inches from one end of insulator 310 and extends for 11½ inches. The thickness of insulation between face 318 and the cavity 60 is about ⅜ inches.

Horizontal ventilation slots 64 and 66 may be formed in the face 318 so as to reduce or eliminate dampness which tends to build up on the lower portions of trunks protected by insulation devices, especially during rainy seasons. Preferably, the slots have a semi-cylindrical shape with a diameter between approximately 1 inch and 1½ inches. Surprisingly, the use of such vent slots has been found to have virtually no effect on the insulating properties of the insulator 310, as long as liquid in container 62 positioned in a slot or recess 60 is being frozen. The use of such ventilation slots provides quick drying of the trunk, thereby avoiding an environment that promotes growth of destructive fungus, such as phytophthora, one of the principal causes of citrus tree mortality. Further, the number and particular shape of the slots are not critical so long as the total area of the openings does not detract substantially from the insulating properties.

Considering the container 62 in more detail, it is preferably made of a suitable polyethylene material and is glued or otherwise secured within the recess 60, such as with a flat splint 70. A container or bag having a wall thickness of between 2 mils and 6 mils has been found to be suitable. One embodiment of the bag has an unfilled length of 12 inches and width of 3 inches. When filled, such bag measures approximately 11 inches by 2 inches by ½ inches and contains 180 to 220 grams of water. Preferably, a few milligrams of a crystallization initiator, such as phenazine or silver iodide crystals, are added to the water to avoid supercooling and maintain the freezing temperature until all the heat of fusion has been given up.

In order to keep the solution bag or container 62 from forming a water retaining pocket around the trunk, a splint 70 having pointed ends 72 is inserted into portions of the member 312 on both ends of the recess 60. The splint is made of a stiff, but resilient material, such as a suitable polyvinyl chloride, ABS copolymer, or high impact styrene, so that the splint is bulged by the liquid in the container and makes contact with the tree in only one vertical line. Use of the splint insures that rain water has a chance to drain freely to the ground, which, in combination with the ventilation slots 64, 66 insures a relatively dry tree trunk. It is also possible to form the splint 70 from wood. If desired, the splint can be impregnated with an at least partially water soluble fungicide, such as $CuSo_4$, so that, as water runs down the trunk, the fungicide dissolves from the splint to protect the tree.

Another advantage of the insulating device containing a liquid heat source is that the thickness of insulation can be much less than is otherwise needed, without the solution, for equal protection, thus saving the cost of insulating material not used. A further advantage of this insulating device is that the heat released by the liquid as it cools tends to keep the plant temperature higher, affording protection for plants that have very little cold hardiness and, conversely, it protects the trunk from extremely high daytime temperatures in the summer.

Comparative laboratory tests of the insulator of the present invention with polyurethane and fiberglass wraps used in accordance with known techniques demonstrate the significant temperature protection achieved by the present invention. The test results are illustrated in the graph, FIG. 8. Four separate young Valencia orange trees about 1 to 1½ inches in trunk diameter were used in the test. A first tree was left unwrapped. The trunk of the second tree was protected by an insulator of the present invention of the type shown in FIGS. 6 and 7. The insulator had the approximate dimensions described above for the FIGS. 6 and 7 embodiment. The heat sink plastic bag containers were each filled with 210 ml. of water seeded with 0.01% by weight phenazine. A third tree trunk was wrapped to a height of 15 inches with a polyurethane wrap which was 15" wide, 36" long and ¾" thick. The fourth tree was wrapped to a height of 15 inches with a fiberglass wrap which was 3½" thick with an aluminum foil backing and measured 15" by 18".

Curve 401 on FIG. 8 plots the ambient air temperature over the period of time of the test. Each of the tree trunk temperature measurements were made at approximately 7" from the base of the tree. Curve 403 shows the temperature of the unwrapped tree. Freezing occurred at point 405 after about 9 hours when the ambient air temperature reached about 25° F. Normally, a prolonged exposure to a temperature of approximately 26° F. is sufficient to cause freeze damage. The temperature of the tree wrapped with the polyurethane wrap is illustrated by curve 407. The tree began to freeze at point 409 after about 10 hours of reduced temperature when the ambient temperature was at about 21° F. Curve 411 plots the temperature of the tree trunk wrapped with the fiberglass insulation. Freezing of the trunk commenced at point 413 after about 11 hours, when the ambient temperature was about 29° F. Finally, curve 408 plots the temperature of the tree trunk insulated in accordance with the present invention. Point 415 indicates commencement of freezing of the water heat sinks. As shown, the temperature of the tree trunk protected by the instant invention maintained a temperature of about 32° F. for the full term of the test, approximately 22 hours, thus insuring complete protection of the portion of the tree trunk surrounded by the insulator.

A further advantage of the present invention can be obtained by designing each insulator half in a shape which, upon 180° rotation, is capable of mating with an identical shaped insulator half. Such shapes, for instance, are shown in the embodiments of FIGS. 1 and 2, FIG. 3, and FIGS. 6 and 7. By such design, substantial savings in the manufacture of the insulator can be achieved because only a single mold is necessary for both insulator halves. A properly designed insulator half can be made to mate with an identically shaped half upon 180° rotation if the surfaces 26, 126, 226 and 326, and 18, 118, 218 and 318, are made perpendicular to the side of the insulator half, such as shown in FIG. 2.

Although the previously described embodiments of the present invention have used insulating devices formed of two halves, it will be appreciated that other shapes are possible. For instance, one part or element of the device can be a substantially U-shaped member having legs with parallel inner faces, and the other part or element can be a plug insertable into the U-shaped member. The plug has parallel faces that can be placed in intimate sliding contact with the inner faces of the legs of the U-shaped member. It will be appreciated that other shapes can also be used to form the insulating device.

During field tests of insulators according to the present invention, it has been found that trees to be protected are either straight or bent in one place. By rotating the wrap it is possible to orient the long oval opening at the top to permit a good fit. It has further been found that the insulator of the present invention is strong enough to straighten slightly deformed trees.

The invention has been described in detail with particular reference to preferred embodiments thereof, but it will be understood that variations and modifications can be effected within the spirit and scope of the invention.

What is claimed is:

1. An insulating device for thermally insulating the trunk of a plant which includes a heat sink means positionable in close proximity to the portion of the trunk to be insulated, said heat sink means containing a liquid that freezes at a temperature slightly above the temperature at which damage to the plant occurs and that has a high latent heat of fusion; and means for holding said heat sink means in close proximity to the portion of the trunk to be insulated, said holding means being formed by two semirigid, thermally insulating elements which are self-adjusting so that the size of a cavity within said holding means increases as the size of the trunk increases, said latent heat of fusion being given up to the plant trunk during periods of reduced ambient temperature below that which would cause damage to the plant.

2. An insulating device according to claim 1, wherein said liquid is water containing a silver iodide crystallization initiator.

3. An insulating device according to claim 1, wherein said liquid is water containing a sufficient quantity of silver iodide crystals to prevent supercooling and initiate crystallization of the water at or near 32° F.

4. An insulator for thermally insulating and protecting the trunks of plants which comprises two substantially identical semi-rigid halves formed of insulating material substantially shaped in the form of a Z having 90° angles in trasverse cross-section, each half having a pair of cooperating faces that extend parallel to each other in a longitudinal direction and a longitudinally extending recess positioned between the faces, said recesses when the halves are assembled defining a center cavity substantially in the center of the insulator, the size of which is adjustable by movement of said halves in accordance with changes in the girth of the plant, a longitudinally extending opening formed in each of said recesses, means for maintaining the interior of said cavity above a predetermined temperature positioned in each of said recesses, said means comprising a fluid and being operative when ambient temperatures fall below the predetermined temperature; and means for holding the two halves together while permitting relative movement of said halves in a transverse direction, said halves having a thickness of insulating material sufficient to maintain thermal insulating of the trunk during relative movement of said halves, the insulating material thickness being maintained substantially constant during changes in the girth of the plant.

5. An insulator according to claim 4, further comprising means for retaining said means for maintaining a predetermined temperature in said openings.

6. An insulator according to claim 4, further comprising at least one ventilation slot formed in one of said halves, said slot extending from an external surface of the half to said cavity so that fluid communication is established between the cavity and the ambient environment.

7. A self-expanding insulator for thermally insulating and protecting the trunk of a plant which comprises:
(a) two semi-rigid elements made of lightweight insulating materials which, when assembled, define a self-expanding cavity substantially in the center of the assembled elements;
(b) means in cooperation with said elements for allowing automatic self-expansion of the cavity in accordance with changes in the girth of the trunk, said thermal insulation provided by said elements being maintained during said self-expansion; and
(c) heat sink means associated with the elements and positioned in close proximity to a substantial portion of the plant trunk, said heat sink means comprising a freezable container means which contains a liquid with a high latent heat of fusion having a freezing temperature slightly above the temperature which causes damage to the plant to be protected.

8. An insulator, according to claim 7, wherein said liquid is water containing a silver iodide crystallization initiator.

9. An insulator, according to claim 8, wherein said crystallization initiator is silver iodide crystals.

10. A method of thermally insulating and protecting a plant which comprises: (a) positioning a self-expanding, semi-rigid, thermally insulating, protecting means which supports a heat sink means in close proximity to a substantial portion of the plant trunk to be protected, said protecting means comprising two elements having two spaced-apart, longitudinally extending parallel faces that are placed in intimate contact with two longitudinally extending parallel faces of the other element when the insulator is assembled, which elements are movable transversely with respect to each other while the parallel faces maintain longitudinally extending contact with each other, the parallel faces being interconnected by portions at least one of which is partially recessed to define a center cavity substantially in the center of the insulator, the size of the center cavity being adjustable by relative movement between said elements in accordance with the changes in the girth of the trunk; said heat sink means comprising a liquid having a temperature of freezing above that temperature which causes damage to the plant and a high latent heat of fusion; (b) releasably securing said protecting means in a position encompassing said plant in such manner that said protecting means is expandable by growth of the plant; and (c) allowing said latent heat of fusion to be given up to the plant during periods of reduced ambient air temperature below that which would cause damage to the plant.

11. The method of claim 10 wherein said heat sink means is water containing a silver iodide crystallization initiator which freezes at about 32° F. and gives up its latent heat of fusion to the protected plant trunk when the ambient air temperature is reduced below the freezing temperature of the heat sink means.

12. A semi-rigid insulator for thermally insulating and protecting trunks of plants comprising:
two elements formed of thermally insulating material, each element having two spaced-apart, longitudinally extending parallel faces that are placed in intimate contact with two longitudinally extending parallel faces of the other element when the insulator is assembled, which elements are movable transversely with respect to each other while the parallel faces maintain longitudinally extending contact with each other, the parallel faces being interconnected by portions at least one of which is partially recessed to define a center cavity substantially in the center of the insulator, the size of the center cavity being adjustable by relative movement between said elements in accordance with the changes in the girth of the trunk, at least one of the elements forming a heat sink cavity facing the center cavity, liquid placed in the heat sink cavity, the liquid freezing at a temperature sufficiently above the temperature at which freeze damage will occur to the plant insulated by the insulator, the heat of fusion of the liquid as it freezes serving to maintain the plant above the temperature at which the plant would suffer freeze damage; and
means for holding the parallel faces of the elements in substantially intimate contact while permitting movement of said elements by a force exerted by growth of the plant.

13. The insulator of claim 12, wherein the at least one recessed portion is formed as an arc having a radius equal to one-half the maximum diameter of a plant trunk to be insulated and protected, the chord of the arc being perpendicular to the two parallel faces and the distance between the chord and the tangent line to the center of the arc being approximately one-half the diameter of a plant to be protected at the time the insulator is applied, and wherein said elements are constructed of a semi-rigid, highly efficient insulating material covered with weather resistant coating.

14. The insulator of claim 13, in which the insulating material forming at least one of the parallel faces of one of the elements has an average thickness between 1 and 2 inches.

15. The insulator of claim 13, in which the insulating material is expanded polystyrene of a density such that the K factor in BTU per hour, per °F., per square foot of area, per inch of thickness, is less than approximately 0.25.

16. The insulator of claim 13, in which the heat sink cavity extends nearly the entire length of the element.

17. The insulator of claim 13, in which the heat sink cavity is formed in one of the elements, the cavity extending nearly the entire length of the element and being formed by arcs of two circles having approximately the same center as the center of the arc forming the cavity, the radius defining the inner wall of the heat sink cavity being sufficiently longer than the radius of the arc defining the center cavity to leave a relatively thin insulating wall between the center cavity and the heat sink cavity, the heat sink cavity, having sufficient cross-sectional area such that heat released from liquid contained in the heat sink cavity protects the plant from freeze damage.

18. The insulator of claim 17, further comprising a liquid sealed inside a flexible container placed inside the heat sink cavity of the insulator.

19. The insulator of claim 18, wherein the flexible container for the liquid is constructed of polyester film.

20. The insulator of claim 17, in which a heat sink cavity is formed in both elements.

21. The insulator of claim 12, further comprising at least one ventilation slot extending from an outer surface of one of said elements to an inner surface thereof for admitting air into the interior of said insulator.

22. The insulator of claim 21, wherein the slot is formed in one of said parallel faces.

23. The insulator of claim 21, wherein a slot is formed in each of said elements, said slots being formed as grooves in said parallel faces.

24. The insulator of claim 23, wherein there are two spaced apart slots formed in each face.

25. The insulator of claim 12, in which said heat sink cavity comprises liquid receiving recesses formed in and extending inwardly from facing interior faces of each of said elements.

26. The insulator of claim 25, further comprising sealed containers of liquids positioned in said recesses and connected to interior portions of said elements.

27. The insulator of claim 26, further comprising flat splints insertable lengthwise into end walls of said elements for retaining said containers in said recesses and for minimizing contact between said containers and a protected trunk to facilitate rain water drainage and drying of the trunk surface.

28. The insulator of one of claims 12, 13, 16, 17, 18, 21, 22, 24, 25, 26, or 27, wherein said elements are formed as substantially equal halves.

* * * * *